United States Patent [19]

Edwards et al.

[11] Patent Number: 6,020,434
[45] Date of Patent: Feb. 1, 2000

[54] SYNERGISTIC BLENDS OF POLYETHYLENES EXHIBITING ENHANCED GLOSS PROPERTIES

[75] Inventors: Ray Edwards, Henderson; Whitney Kay, Longview, both of Tex.

[73] Assignee: Eastman Chemical Company, Kingsport, Tenn.

[21] Appl. No.: 09/023,440

[22] Filed: Feb. 13, 1998

Related U.S. Application Data

[60] Provisional application No. 60/035,406, Feb. 19, 1997, and provisional application No. 60/055,773, Aug. 14, 1997.

[51] Int. Cl.[7] .............................. C08L 23/00; B32B 17/00
[52] U.S. Cl. .......................... 525/240; 525/240; 428/410
[58] Field of Search .............................. 525/240; 428/410

[56] References Cited

U.S. PATENT DOCUMENTS

| | | |
|---|---|---|
| 3,176,052 | 3/1965 | Peticolas . |
| 4,587,303 | 5/1986 | Turtle ....................................... 525/240 |
| 4,786,688 | 11/1988 | Thirsault et al. ........................ 525/240 |
| 5,066,725 | 11/1991 | Haselier ................................... 525/240 |
| 5,268,230 | 12/1993 | Edwards . |
| 5,350,476 | 9/1994 | Edwards .............................. 156/244.11 |
| 5,744,551 | 4/1998 | Kupperblatt et al. .................... 525/240 |
| 5,858,491 | 1/1999 | Geussens et al. ....................... 428/36.9 |

FOREIGN PATENT DOCUMENTS

| | | |
|---|---|---|
| 0687588 A2 | 2/1995 | European Pat. Off. . |
| 0 687 558 | 12/1995 | European Pat. Off. . |

OTHER PUBLICATIONS

Sinclair, K "Third generation Polyolefin Technologies ... ", Society of Plastic Engineers Polyolefins IX Intern. Conference, Feb. 1995.

*Primary Examiner*—David W. Wu
*Assistant Examiner*—Tanya Zalukaeva
*Attorney, Agent, or Firm*—Andrew B. Griffis; Rose M. Allen; Harry J. Gwinnell

[57] ABSTRACT

Blends of at least two polyethylenes are described for extrusion coatings, blown films and cast films. The gloss exhibited by such coatings or films is surprisingly higher than the gloss of the individual components.

9 Claims, No Drawings ized polyethylene are enhanced even beyond the higher gloss previously obtained by these inventors from a narrow molecular weight polyethylene when the narrow molecular weight polyethylene is combined with a polyethylene that has a broad molecular weight distribution.

SYNERGISTIC BLENDS OF POLYETHYLENES EXHIBITING ENHANCED GLOSS PROPERTIES

CROSS-REFERENCE TO RELATED APPLICATIONS

This Application claims the benefit of Provisional Application Ser. No. 60/035,406, filed Feb. 19, 1997, and Provisional Application Ser. No. 60/055,773, filed Aug. 14, 1997, under 35 USC §119.

FIELD OF THE INVENTION

The present invention relates to polyethylene compositions that can be used for extrusion coatings, cast films, and blown films.

BACKGROUND OF THE INVENTION

A high gloss surface is often desired in applications such as photographic papers, high quality copier papers, wrappers for foods, chewing gum, and clothing, and other flexible packaging. The eye-catching appeal of high gloss coatings is considered a selling point in the retail trade.

Likewise, good see-through transparency is important in flexible packages made from blown or cast films such as clothing wrappers, permitting a buyer to examine the contents of a package without the necessity of opening the package. This is also important in certain extrusion coating applications such as document laminations.

U.S. Pat. Nos. 5,268,230 and 5,350,476, issued to one of the present inventors, disclose a coating composition and process of coating therewith, producing a single, dual purpose, high gloss polyethylene extrusion coating with a gloss comparable to or even greater than that exhibited by polypropylenes. By "dual purpose" is meant that the coating has both a high gloss and is oxidizable, and thus printable. A single, dual purpose coating was not previously possible with polyethylene or polypropylene. The disclosed process and article of manufacture are based on a low density polyethylene of narrow molecular weight distribution having a melt index of 2.0 to 4.0 dg/min, a swell ratio of 1.2 to 1.35, an annealed density of 0.91 to 0.93-g/cc, and a polydispersity index of between about 6 and about 9.

Copending, commonly assigned Application Ser. No. 09/023,900 (not yet assigned; Eastman Chemical Co. Docket No. 70537) discloses a coating and process therefore, producing a polyethylene extrusion coating also having a gloss comparable to that exhibited by polypropylenes, and providing for a coating having high stress crack resistance and hot tack ("pop-open" resistance), having superior neck-in properties and providing for tougher seals. The disclosed process and article of manufacture are based on a low density polyethylene of narrow molecular weight distribution having a melt index of 0.5 to 4.0 dg/min, preferably about 0.5 to below 2.0 dg/min, a swell ratio of 1.2 to 1.35, an annealed density of 0.91 to 0.93-g/cc, and a polydispersity index between about 5.5 and about 9.

The polyethylene claimed in the aforementioned U.S. Patents and the Patent Application permitted extrusion coatings with a gloss comparable or even superior to that of polypropylene, with polypropylene having previously been considered the glossiest coating material in the extrusion coating industry. Gloss, or specular reflectance, of a surface is a measure of the light reflected by that surface as compared to that which would be reflected by a perfect mirror. A gloss value of 100 is 1/10th of the assigned value of 1,000 for a perfect mirror. Gloss is typically measured at 75° and/or 60° (from the vertical) in accordance with ASTM D2457. A typical extrusion coated polypropylene exhibits a 75° Surface Gloss of about 86, while the aforementioned Patents and Applications disclose extrusion coated polyethylenes exhibiting a 75° Surface Gloss as high as, for example, 90.

However, even higher gloss coatings are desired in some extrusion coating applications. The extrusion coating industries, and photographic and copier paper makers in particular, are continually requesting their polymer suppliers to develop and supply polyethylenes that produce glossier films and coatings. Therefore it would be very desirable to develop a polyethylene which would provide even glossier films and coatings than those currently available, without detracting from the film or coating transparency of the currently available polyethylenes.

SUMMARY OF THE INVENTION

The present invention relates to:

(1) a composition of matter comprising a polyethylene blend, the blend comprised of at least two components, wherein a first component is a polyethylene having a narrow molecular weight distribution as reflected by having a melt index below 6.0, preferably of 0.5 to 4 dg/min at 190° C., a swell ratio below 1.5, preferably of 1.2 to 1.35, and an annealed density of 0.91 to 0.93 g/cc.; and a second component polyethylene having a broad molecular weight distribution as reflected by having a melt index of about 6 or above, preferably of 6 to 200 dg/min at 190° C., a swell ratio about 1.5 or above, preferably of 1.7 to 1.8, and an annealed density of 0.91 to 0.92 g/cc;

(2) a process which produces a single dual purpose high gloss cast film comprising extruding against a high gloss chill roll the aforementioned composition of matter; and (3) an article of manufacture comprising the aforementioned composition of matter, which may be in the form of a cast film, blown film, and/or extrusion coated product, the cast film and blown film having a high gloss surface and good see-through transparency, and the extrusion coated products having a substrate layer and a high gloss extrusion coated layer.

Accordingly, it is an object of the present invention to provide blown films and cast films having a high gloss surface and good see-through transparency, and extrusion and coextrusion coatings having a high surface gloss, from a blend of at least two different polyethylene compositions.

It is another object of the present invention to provide a blend of at least two polyethylene compositions, wherein the gloss of a coating or film is higher than what would be expected from a linear combination of polyethylene compositions.

It is still another object of the present invention to provide a blend of at least two polyethylene compositions, wherein the gloss of a film or coating is higher than the gloss provided from either composition alone.

These and other objects, features, and advantages of the present invention will become apparent as reference is made to the following detailed description, preferred embodiments, and specific examples.

DESCRIPTION OF THE PREFERRED EMBODIMENTS

The present inventors have unexpectedly discovered that the gloss and transparency properties of the narrow molecular weight distribution extrusion coating polyethylene described in the above patents and patent applications can be significantly improved by adding to is that polyethylene composition at least some amount of a high melt index polyethylene, as described further below.

As mentioned, U.S. Pat. Nos. 5,268,230 and 5,350,476 and copending, commonly assigned Application Ser. No. 09/023,900 (not yet assigned) referred to above, disclose processes involving a polyethylene of low melt index and narrow molecular weight distribution to effect a high gloss extrusion coating. The applicants have subsequently discovered certain high melt index polyethylenes which, when individually cast into film, exhibit significantly higher surface glosses and see-through transparencies when compared to cast films made from the compositions and processes set forth in the aforementioned patents and patent applications.

However, these certain high melt index polyethylenes are not extrusion coatable in themselves, because they are too fluid in the melt state. Instead, they are used in molding and carpet coating applications. These high melt index polyethylenes have melt indexes of above about 6 dg/min up to about 200-dg/min.

In the blend according to the present invention, it is preferred that the amount of high melt index polyethylene be less than 50 W by weight. The more preferred amount of high melt index polyethylene required is about 20 weight percent or less. The resulting two-component blends produce very high gloss cast films and very high gloss extrusion coatings heretofore unachievable, even, in some cases, with those individual high gloss polyethylenes described in the aforementioned patents and invention report.

The applicants have also unexpectedly discovered that the gloss and transparency properties of the narrow molecular weight distribution extrusion coating polyethylene described in the above patents and copending application can be significantly improved by adding to that polyethylene about 20 weight percent of a low density polyethylene having a melt index of above about 6 dg/min, preferably about 20 dg/min and a broad molecular weight distribution. The surface gloss of the resulting two-component blend is unexpectedly superior to the cast film gloss and extrusion coating gloss exhibited by either component used in the polyethylene blend comprising the present invention. The unexpected synergism achieved by blending two polyethylenes to obtain a higher gloss than either of the two components is very unexpected.

The composition of matter in the present invention comprises a two-component polyethylene blend, the blend comprised of a first component, preferably a major component, which is a polyethylene of narrow molecular weight distribution, which is reflected in its being characterized by having a melt index below 6, preferably of 0.5 to 4 dg/min at 190° C., a swell ratio below 1.5, preferably of 1.2 to 1.35, and an annealed density of 0.91 to 0.93 g/cc; and a second component, preferably a minor component, which is a polyethylene of broad molecular distribution, which is reflected in its being characterized by having a melt index of about 6 or above, preferably 6 to 220 dg/min at 190° C., a swell ratio about 1.5 or above, preferably of 1.7 to 1.8, and an annealed density of 0.91 to 0.92 g/cc. By "major component" is meant more than 50% by weight; by "minor component" is meant less than 50% by weight.

It is to be understood that the blend may contain more than two components. So, for example, it may contain a third component of polyethylene having properties different from those of the first or second components, i.e., a different melt index or swell ratio.

First Component:

The first and preferably major component of the polyethylene blend that comprises the present invention has a melt index below about 6.0, preferably of about 0.5 to about 4 dg/min at 190° C. as defined herein after. The first component polyethylene preferably has a melt index of about 1.2 to about 3 dg/min, more preferably 1.2 to below 2 dg/min, with a melt index of 1.7 dg/min being most preferred.

The first component of the polyethylene blend that comprises the present invention preferably has a swell ratio below 1.5, preferably of about about 1.2 to about 1.35, as defined herein after. The swell ratio of the first component of the polyethylene blend is more preferably about 1.25 to 1.33, with a swell ratio of about 1.3 being most preferred.

The first component of the polyethylene blend that comprises the present invention preferably has an annealed density of about 0.91 to about 0.93 g/cc, as defined herein after. The first component of the polyethylene blend that comprises the present invention more preferably has an annealed density of 0.915 to 0.927 g/cc, with an annealed density of 0.92 g/cc being most preferred.

The first component has a polydispersity index of about 9, preferably above about 5.5, more preferably between 5.5 and 7.8, still more preferably between about 5.5 and below 6.0, with a polydispersity index of about 5.8 being most preferred.

The term "narrow molecular weight distribution" is means narrow molecular weight distribution as reflected, for instance, in the polydispersity index alone, and/or by the aforementioned swell ratio, which characterizes the first component. It is to be understood that the skilled artisan in possession of the present disclosure would recognized the meaning of the term "narrow molecular weight distribution" and could prepare or select the same, based on the indicated characteristics of swell ratio, and/or based on the indicated polydispersity index.

Second Component:

The second and preferably minor component of the polyethylene blend that comprises the present invention has a melt index higher than the melt index of the first component, i.e., about 6 or above, preferably having a melt index of 6 to 220 dg/min at 190° C. as defined herein after. The second component polyethylene more preferably has a melt index of 6 to 100 dg/min, still more preferably 10 to 40, with a melt index of 20 dg/min being most preferred.

The second component of the polyethylene blend that comprises the present invention preferably has a swell ratio above about 1.5, preferably of about 1.7 to about 1.8, as defined herein after. The swell ratio of the minor component of the polyethylene blend is more preferably about 1.65 to 1.80, with a swell ratio of about 1.75 being most preferred.

The second component of the polyethylene blend that comprises the present invention preferably has an annealed density of 0.91 to 0.92 g/cc, as defined herein after. The second component is preferably the minor component of the polyethylene blend that comprises the present invention more preferably has an annealed density of 0.915 to 0.920, with an annealed density of 0.917 being most preferred.

The second and preferably minor component is preferably a polyethylene having a broad molecular weight distribution, as reflected in the polydisperity index. It is preferred that the second component have a polydispersity index greater than 9.

The term "broad molecular weight distribution" means broad molecular weight distribution as reflected, for instance, in the polydispersity index alone, and/or by the aforementioned swell ratio, which characterizes the second component. It is to be understood that the skilled artisan in possession of the present disclosure would recognized the meaning of the term "broad molecular weight distribution" and could prepare or select the same, based on the indicated characteristics of swell ratio, and/or based on the indicated polydispersity index.

The Blend:

It is preferred that the first component is the major component, more preferably that it comprise at least 80% of the blend; it is preferred that the second component is the minor component, more preferably that it comprise 20% or less of the blend. The percent composition is based on weight percent.

The polyethylenes of the present invention are preferably polyethylene homopolymers, however, minor amounts of other comonomers such as propylene can be present. The amount of comonomer is preferably less than 5 mole percent. The polyethylene blend of the present invention can also be blended with minor amounts of other polymers preferably not over 5 weight percent so as not to detract from the surface gloss.

Examples of suitable polyethylene materials useful in the practice of the present invention can be prepared by polymerizing relatively high purity ethylene in a stirred reactor at pressures above about 1,000 atmospheres and temperatures above about 200° C., using a peroxide-type catalyst, such as, for example, di-tertiarybutyl peroxide. Lower purity ethylene containing inert materials such as methane, ethane, carbon dioxide, and the like, may be introduced into the ethylene feed to control the purity thereof. Publications to which the reader is directed for further general details on the preparation of suitable low density polyethylenes are the text Polythene by Renfrew and Morgan, at pp. 11–17 and the article in Petroleum Refiner (1956) by Thomasson, McKetta and Ponder, found at p. 191.

The processes according to the present invention, in either case, entail extruding a cast film or extrusion coating a substrate with the polyethylene blend against a glossy chill roll. By extruding cast film it is meant extruding a molten polyethylene web and quenching it directly against a chill roll. By extrusion coating it is meant direct application after extrusion onto a substrate with subsequent quenching on a chill roll. The glossy, or high gloss, chill roll used in the present invention in both film and coating applications preferably has a root mean square surface finish, as defined herein after, less than 10. The glossy chill roll more preferably has a root mean square surface finish of at least 1, but no more than 6, with a root mean square surface finish of no more than 2 being most preferred. A glossy chill roll is required in order to impart a glossy finish to the coating. Thus, a chill is roll with a root mean square surface finish much above 10 is not glossy and would not produce a coating with a glossy surface. However, a high gloss chill roll with a root mean square surface finish near 0 or 1 is almost impossible to produce and maintain. It also would tend to cause chill roll release problems in the extrusion coating process.

The glossy chill roll surface temperature is preferably less than 20° C., but yet higher than the environmental dew point of water. A glossy chill roll surface temperature much above 20° C. permits the growth of crystals within the polymer thus detracting from a glossy finish. It is clear that the condensation of water on the chill roll would interfere with the surface finish of the coating thus the chill roll cannot be too cold.

The polyethylene blend of the present invention is preferably cast into film at a temperature greater than 200° C., preferably between 260° C. and 300° C., with a temperature of 280° C. being more preferred. Extrudate temperatures within this range are important to cast the preferred films of the present invention.

The polyethylene blend of the present invention is preferably extrusion coated at a temperature greater than 300° C., preferably between 300 and 340° C., with a temperature between about 315° C. and 325° C. being more preferred. Extrudate temperatures within this range are important to enable extrusion coating of the present invention.

Blown films, cast films, and extruded coatings may be made from the blend composition by methods within the purview of the skill artisan in possession of the present disclosure.

The process of the present invention also preferably entails an oxidizing step wherein the resultant coated surface is oxidized under conditions sufficient to impart a level of oxidation required for the applicable end use without detracting from surface gloss. Suitable examples of oxidation processes are flame impingement, corona discharge, and ozone exposure, with corona discharge being more preferred due to cleanliness and health considerations.

The resulting cast film article of the present invention preferably has a surface gloss greater than 75 as defined herein after. The surface gloss of the cast film is more preferably greater than or equal to 80, with a surface gloss greater than 80 being most preferred. A surface gloss much below 75 offers no advantage over conventional polyethylenes made into cast film.

The resulting extrusion coated article of the present invention preferably has a surface gloss greater than that expected by a linear combination of the components and still more preferably greater than that provided by either component alone.

Polyethylenes of the present invention can contain a certain additive to enhance chill roll release during extrusion coating. Suitable chill roll release additives include erucylamide, oleamide, polyethylene glycol, calcium stearate, etc. Levels of these additives are preferably less than about 0.1 weight percent. Other additives, such as minor amounts of stabilizers, fillers and the like can be added to the composition of the present invention. Such materials can be present in the polyethylene composition or added just prior to the extrusion coating process.

Substrates contemplated for use in the practice of the present invention include, but are not limited to, paper and material comprising paper, such as photographic paper, paperboard; fiber; polymeric material; metal foil; and the like. Polymeric substrates include polyolefins or functionally modified polyolefins, polyesters or functionally modified polyesters, ethylene-vinyl alcohol copolymers or functionally modified derivatives thereof, polyamides or functionally modified polyamides, and the like including embossed and/or oriented polymeric substrates with and without microvoiding agents/pigments such as titanium dioxide, barium sulfate, and calcium carbonate.

Extruder output rates of the extrusion coating process are not critical to the present invention. Additionally, the speeds of the extrusion coating process are not critical but slower chill roll rotation speeds produce better gloss; however, production rates need to be considered. Again, the cast film and extrusion coating detailed techniques required to achieve high coating gloss and other variations of the present invention will be apparent to one of ordinary skill reading the present disclosure.

SPECIFIC EXAMPLES

The following examples are meant to illustrate the present invention. Numerous modifications and variations are possible, and it is to be understood that within the scope of the appended claims, the invention may be practiced otherwise than as specifically described herein.

In the examples the properties are determined as follows:

Melt index was determined in accordance with ASTM D1238-62T at 190° C.

Swell ratio is defined as the ratio of the diameter of the extrudate over that of the orifice diameter of the extrusion plastometer in ASTM Designation D1238-62T. The diameter of the specimen is measured in the area between 0.159 cm and 0.952 cm of the initial portion of the specimen as it emerges from the extrusion plastometer. Measurements are made by standard methods according to ASTM Designation D-374.

Annealed density was determined in accordance with ASTM D1505.

Polydispersity Index (Mw/Mn) is obtained by size-exclusion chromatography on a Waters 150° C. gel permeation chromatograph equipped with the standard refractometer detector and a Viscotek 150R differential viscometer system. The 3-column set consisted of Waters' $10^3$, $10^4$, and linear-mixed bed ($10^3$, $10^5$) Micro-Styragel HT columns. The samples were run as 0.125% (wt/vol) solutions in o-dichlorobenzene at 140° C. The data is interpreted using Viscotek Unical software (V4.02), by universal calibration using NBS 1475 (linear polyethylene) and NBS 1476 (branched polyethylene) for the polyethylene samples, and a 272,000 Mw, 44,000 Mn, polypropylene standard with a polydispersity of 6.3 for the polypropylene sample.

Gloss is measured in accordance with ASTM D2457. Gloss or specular reflectance of a surface is a measure of the light reflected by that surface as compared to that which would be reflected by a perfect mirror. A gloss value of 100 is 1/10 of the assigned value of 1,000 for a perfect mirror.

Cast film transparency, or clarity, is measured in accordance with ASTM D1746.

Root mean square defines a surface finish in accordance with American National Standard B46.1. This test is accepted by the American Society of Automotive and Mechanical Engineers.

Referring to Table 1, below, gloss data for Samples A through M and R and S of the following examples were obtained by first casting each sample into film. Each Sample, A through M, and R and S was extruded from a slot die at a melt temperature of 280° C. (536° F.) at a throughput rate of 2.4-lb/hr/inch of die width. The molten web of each sample passed through an air gap of 11-inches before striking a 6-rms chill roll. Films of 1-mil (0.001-inch) thickness were obtained at a haul off speed of 100-fpm.

Again referring to Table 1, below, gloss data for Samples N and O of the following examples were obtained by first extrusion coating 64-lb bleached copier paper. Sample N was extruded from a slot die at a melt temperature of 316° C. (600° F.) at a throughput rate of 9-lb/hr/inch of die width. A coating thickness of 1-mil (0.001-inch) was obtained at a haul off speed of 375-fpm. Sample O was extruded from the same slot die at a melt temperature of 316° C. (600° F.) at a throughput rate of 13-lb/hr/inch of die width. A coating thickness of 1-mil (0.001-inch) was obtained at a laminating speed of 500-fpm. Each sample's molten extrudate passed through an 8.5-inch air gap before striking the 0.5-rms mirror-finished chill roll.

Again referring to Table 1, below, gloss data for Samples P and Q of the following examples were obtained by, first extrusion coating 60-gauge nylon film. The nylon film was first primed with polyethyleneimine to achieve adhesion of the polyethylenes to the nylon film. Each sample was extruded from a slot die at a melt temperature of 305° C. (581° F.) at a throughput rate of 11-lb/hr/inch of die width. After each sample's molten extrudate passed through a 9-inch air gap, it was applied to the nylon film against a mirror-finished chill roll having a 0.02-rms finish. A coating thickness of 0.55-mil (0.00055-inch) was obtained for each sample at a laminating speed of 800-fpm.

Furthermore, unless otherwise specified, all materials used in the examples and set forth in Table 1 are available from Eastman Chemical Company, Kingsport, Tenn. Materials with the suffix "P" are Eastacoat low density polyethylenes; "E" and "A" suffix products are Tenite low density polyethylenes.

Example 1

Refer in Table 1, on the next page, to Sample J and Sample L. Sample J is a molding grade polyethylene with

TABLE 1

| Sample | EASTACOAT POLYETHYLENE FORMULA (OR BLEND COMPOSITION) | MELT INDEX, dg/min | Density, g/cc | Swell Ratio | Extruded Structure | Gloss @ 20° | Gloss @ 45° | Transparency |
|---|---|---|---|---|---|---|---|---|
| A | D4027P | 1.7 | 0.926 | 1.26 | Cast Film | | 51 | 44 |
| B | 1550P | 3.5 | 0.918 | 1.73 | Cast Film | | 15 | 2 |
| C | 20% 1550P + 80% D4027P | 1.9 | 0.924 | 1.36 | Cast Film | | 49 | 18 |
| D | 800E | 1.7 | 0.918 | 1.75 | Cast Film | | 13 | 0.2 |
| E | 85% 800E + 15% 812A | 3.5 | 0.917 | 1.75 | Cast film | | 15 | 0.1 |
| F | 808P | 7.0 | 0.918 | 1.75 | Cast Film | | 26 | 14 |
| G | 10% 808P + 90% D4027P | 1.9 | 0.925 | 1.31 | Cast Film | | 71 | 35 |
| H | 20% 808P + 80% D4027P | 2.3 | 0.924 | 1.36 | Cast Film | | 76 | 29 |
| I | 30% 808P + 70% D4027P | 2.6 | 0.923 | 1.41 | Cast Film | | 75 | 24 |
| J | 811A | 20 | 0.917 | 1.75 | Cast Film | | 77 | 35 |

TABLE 1-continued

| Sample | EASTACOAT POLYETHYLENE FORMULA (OR BLEND COMPOSITION) | MELT INDEX, dg/min | Density, g/cc | Swell Ratio | Extruded Structure | Gloss @ 20° | Gloss @ 45° | Transparency |
|---|---|---|---|---|---|---|---|---|
| K | 20% 811A + 80% D4027P | 2.8 | 0.924 | 1.36 | Cast Film | | 82 | 39 |
| L | 812A | 200 | 0.916 | 1.70 | Cast Film | | 85 | 55 |
| M | 15% 812A + 85% D4027P | 3.4 | 0.925 | 1.34 | Cast Film | | 84 | 44 |
| N | D4027P | 1.7 | 0.926 | 1.26 | Extrusion Coating | 16 | | |
| O | 20% 808P + 80% D4027P | 2.3 | 0.924 | 1.36 | Extrusion Coating | 28 | | |
| P | 95% D4027P + 5% TiO$_2$ | 1.6 | 0.926 | 1.26 | Extrusion Coating | 41 | | |
| Q | 19% 808P + 76% D4027P + 5% TiO$_2$ | 2.2 | 0.923 | 1.36 | Extrusion Coating | 61 | | | a cast film gloss of 77. Sample L is a carpet coating grade polyethylene with a cast film gloss of 85. Neither can be extrusion coated because they are too fluid in the melt state and therefore exhibit excessive neck-in and edge weave during the coating operation.

This example shows that certain polyethylenes exist which have higher cast film glosses than the polyethylene (cast film gloss of 51) claimed in U.S. Pat. Nos. 5,268,230 and 5,350,476 and the copending application referred to above. However, these polyethylenes are not ideally suited for extrusion coating applications.

Example 2

Refer in Table 1 to Composition C. Composition A (51 gloss, 44 transparency) is a preferred high gloss polyethylene having a narrow molecular weight distribution as cited in U.S. Pat. Nos. 5,268,230 and 5,350,476 and in the copending application referred to above. Composition B is a low gloss polyethylene (15 gloss, 2 transparency) having a broad molecular weight distribution. Compositions A and 2 were mechanically blended to obtain Composition C. The cast film gloss and transparency of the blend, Composition C, fall between the extreme glosses and transparencies of Compositions A and B, with the gloss and transparency of the blend being nearer the gloss and transparency of the major component of the blend, Composition A, which is present at 80 weight percent.

From this example, one would predict the resulting gloss and transparency of a blend to be determined by the gloss and transparency properties of the major component in the blend.

Example 3

Refer in Table 1 to Composition E. Composition D (13 gloss, 0.2 transparency) is a low gloss polyethylene having a broad molecular weight distribution. Composition L (85 gloss, 55 transparency) is also a broad molecular weight distribution polyethylene, but apparently because of its very high melt index (200 dg/min) its cast film gloss and transparency are very high. Compositions D and L were mechanically blended to obtain Composition E. As would be expected based on Example 3, the cast film gloss and transparency of the blend, Composition D, fall between the extreme glosses and transparencies of Compositions D and L, with the gloss and transparency of Composition E being nearer the gloss and transparency of the major component of the blend, Composition D, which is present at 80 weight percent.

Example 4

Refer in Table 1 to Composition M. Composition A (51 gloss, 44 transparency) is a preferred high gloss polyethylene having a narrow molecular weight distribution as cited in U.S. Pat. Nos. 5,268,230 and 5,350,476 and in the copending application referred to above. Composition L is a high gloss low density polyethylene (85 gloss, 55 transparency) having a broad molecular weight distribution. Compositions A and L were mechanically blended to obtain Composition M.

This example shows, as expected from Examples 1 and 2, that the gloss of the blend lies between that of either component. But, very unexpectedly, based on the examples above, the minor (but glossier) component, Composition L, dominates the final gloss of the blend.

This example unexpectedly shows that the gloss of a narrow molecular weight polyethylene, e.g., Composition A, can be significantly enhanced by adding to it, to form a two-component blend, a small quantity of a very high gloss minor component. In this example the addition of as little as 15 weight percent of the glossier component effected a resulting blend gloss essentially the same as that of the minor glossier component (84 gloss for the blend, 85 gloss for the minor component).

This example also unexpectedly (based on the above experiments) shows that the transparency of a narrow molecular weight polyethylene, e.g., Composition A, can be significantly enhanced by adding to it, to form a two-component blend, a small quantity of a highly transparent minor component. In this example the addition of as little as 15 weight percent of the more transparent component permitted a resulting blend transparency the same as that of the major component (44 transparency for the blend, 44 transparency for the major component).

Example 5

Refer in Table 1 to Composition K. Composition A (51 gloss, 44 transparency) is a preferred high gloss polyethylene having a narrow molecular weight distribution as cited in U.S. Pat. Nos. 5,268,230 and 5,350,476 and in the copending application referred to above. Composition J is a high gloss low density polyethylene (77 gloss, 35 transparency) having a broad molecular weight distribution. Compositions A and J were mechanically blended to obtain Composition K.

This example shows, as expected from Examples 1 through 3, that the gloss of the blend lies between that of either component. But, unexpectedly based on the previous examples, in this example the minor (but glossier) component, Composition J. dominates the final gloss of the blend.

This example also unexpectedly shows that the gloss of a narrow molecular weight polyethylene, e.g., Composition A, can be significantly enhanced by adding to it, to form a two-component blend, a small quantity of a very high gloss minor component. In this example the addition of as little as 20 weight percent of the glossier component effected a resulting blend gloss essentially the same as that of the minor glossier component (82 gloss for the blend, 44 gloss for the minor component).

Example 6

Refer in Table 1 to Composition H. Composition A (51 gloss, 44 transparency) is the preferred high gloss polyethylene having a narrow molecular weight distribution as cited in U.S. Pat. Nos. 5,268,230 and 5,350,476 and in the copending application referred to above. Composition F is a lower gloss low density polyethylene (26 gloss, 14 transparency) having a broad molecular weight distribution. Compositions A and F were mechanically blended to obtain Composition H.

This example unexpectedly shows a synergistic effect in blending two polyethylenes of given cast film glosses to form a blend having a glossier cast film surface than either polyethylene comprising the blend. This example shows that there is an apparent melt index threshold which must be exceeded by the broad molecular weight polyethylene component in a blend to effect the synergism.

Example 7

Refer in Table 1 to Compositions G and I. Composition A (51 gloss, 44 transparency) is the preferred high gloss polyethylene having a narrow molecular weight distribution as cited in U.S. P. Nos. 5,268,230 and 5,350,476 and in the copending application referred to above. Composition F is a lower gloss low density polyethylene (26 gloss, 14 transparency) having a broad molecular weight distribution. Compositions A and F were mechanically blended to obtain Compositions G and I.

This example confirms the synergistic effect in blending two polyethylenes of given cast film glosses to form a blend having a glossier cast film surface than either polyethylene comprising the blend. This example shows that there is an optimum amount of the broad molecular weight distribution polyethylene component in the synergistic blend, that optimum being between 10 and 30 weight percent.

Example 8

Refer in Table 1 to Samples N and O. Both are extrusion coatings applied to the same nylon substrate. Sample O is a blend which contains a minor, lower gloss polyethylene component (actually Sample F) and a higher gloss major component (actually Sample A). Sample O, the two-component blend containing the lower gloss component exhibits a higher gloss than the glossier major component.

This extrusion coated example confirms the synergism seen in cast film Samples G. H. and I, wherein the resulting gloss of a two-component polyethylene blend is higher than either component. That synergism is also evident in extrusion coated products made using a high gloss chill roll.

Example 9

Refer in Table 1 to Samples P and Q. Both are extrusion coatings applied to the same bleached paper substrate. Sample Q is a blend which contains a minor, lower gloss polyethylene component (actually Sample F) and a higher gloss major component (actually Sample A), and both materials contain 5 weight percent of titanium dioxide. Sample Q. the two-component blend containing the lower gloss component exhibits a higher gloss than the glossier major component.

This extrusion coated example again confirms the synergism seen in cast film Samples G. H. and I, wherein the resulting gloss of a two-component polyethylene blend is higher than either component. That synergism is again evident in extrusion coated products made using a high gloss chill roll.

Example 10

Composition K in Table 1 was tested as a high gloss extrusion coating for copy paper. Composition K (2.8-dg/min melt index, 0.924-g/cc, 1.36 swell ratio) was extrusion coated to a "bright white" copy paper, at a melt temperature of 580° F. (305° C.) at a sufficient die output rate to achieve a coating thickness of 0.001 inch (0.0254 mm) at a line speed of 132-fpm. Its 20° gloss was compared to the 20° gloss of two commercial polyethylene-coated copy papers:

| Copy Paper | 20° Gloss |
|---|---|
| Composition K on Bright White Paper | 63 to 68 |
| "Tapestry" Type 210 | 47 to 54 |
| "Tapestry" Type 220 | 37 to 43 |

This example shows that the present invention provides superior gloss characteristics over current commercially-marketed copy papers.

The invention has been described above in detail with particular reference to preferred embodiments thereof, but it will be understood that variations and modifications other than as specifically described herein can be effected within the spirit and scope of the invention. Moreover, all patents, patent applications, provisional patent applications, and literature references or other publications noted above are incorporated herein by reference for any disclosure pertinent to the practice of this invention.

We claim:

1. A composition comprising a blend of at least two polyethylene components, the first polyethylene component having a narrow molecular weight distribution as reflected by having a melt index below 6.0 dg/min at 190° C., a swell ratio below 1.5, and an annealed density of 0.91 to 0.93 g/cc; and the second polyethylene component having a broad molecular weight distribution as reflected by having a melt index of at least about 6 dg/min at 190° C., a swell ratio about 1.5 or above, and an annealed density of 0.91 to 0.92 g/cc, wherein the first polyethylene component is present in an amount greater than 50% by weight and the gloss of the composition in coating or film form is higher than the gloss provided from either component alone.

2. A process of extruding a polyethylene composition against a high gloss chill roll, the composition comprising:

a first polyethylene component having a narrow molecular weight distribution as reflected by having a melt index below 6.0 dg/min at 190° C., a swell ratio below 1.5, and an annealed density of 0.91 to 0.93 g/cc; and a second polyethylene component having a broad molecular weight distribution as reflected by having a melt index of at least about 6 dg/min at 190° C., a swell ratio about 1.5 or above, and an annealed density of 0.91 to 0.92 g/cc, wherein the first polyethylene component is present in an amount greater than 50% by weight and the gloss of the extruded composition is higher than the gloss provided from either component alone.

3. The composition of claim 1 in cast film form.

4. The composition of claim 1 in blown film form.

5. The composition of claim 1 in the form of a coating on a substrate.

6. The composition according to claim 1, wherein said first polyethylene component is present in the amount of about 80 weight percent and said second component is present in the amount of about 20 weight percent.

7. The composition according to claim 1, wherein said first polyethylene component has a melt index of about 0.5 to about 4-dg/min at 190° C., and a swell ratio of-between about 1.2 and about 1.35, and said second polyethylene component has a melt index of about 6 to about 220-dg/min, and a swell ratio of between about 1.7 and about 1.8.

8. The composition according to claim 7, wherein said first polyethylene component is present in the amount of about 80 weight percent and said second polyethylene component is present in the amount of about 20 weight percent.

9. The composition according to claim 8, wherein said first polyethylene component has a melt index of about 1.7-dg/min at 190° C. and said second polyethylene component has a melt index of about 20-dg/min at 190° C.

* * * * *

UNITED STATES PATENT AND TRADEMARK OFFICE
CERTIFICATE OF CORRECTION

PATENT NO. : 6,020,434
DATED : February 1, 2000
INVENTOR(S) : Ray Edwards and Whitney Kay Beall It is certified that error appears in the above-identified patent and that said Letters Patent is hereby corrected as shown below:

On the title page: Item
[75] Inventors:, "Whitney Kay" should be ---Whitney Kay Beall---.

Signed and Sealed this

Seventh Day of November, 2000

Attest:

Q. TODD DICKINSON

*Attesting Officer*  *Director of Patents and Trademarks*